Dec. 28, 1954  E. F. JERNIGAN  2,697,934
DEW POINT TESTING APPARATUS
Filed April 1, 1953
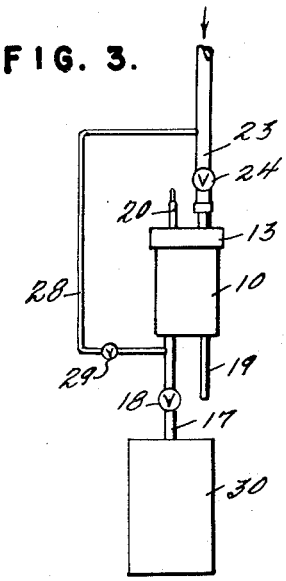
FIG. 3.
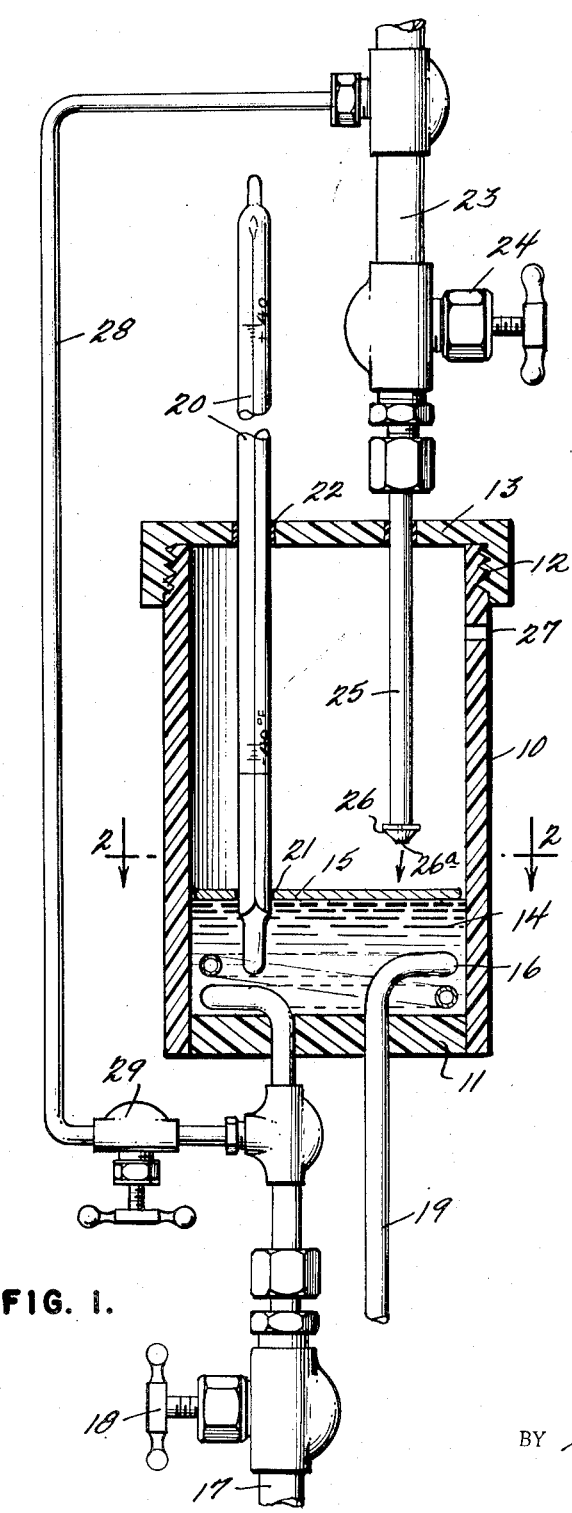
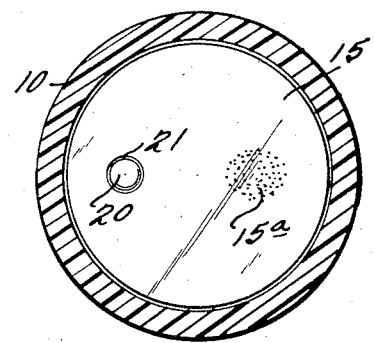
FIG. 2.
FIG. 1.
INVENTOR
ELZIE F. JERNIGAN
BY
ATTORNEY

2,697,934

DEW-POINT TESTING APPARATUS

Elzie F. Jernigan, Tulsa, Okla., assignor to Warren Petroleum Corporation, Tulsa, Okla., a corporation of Delaware Application April 1, 1953, Serial No. 346,222

6 Claims. (Cl. 73—17)

This invention consists in new and useful improvements in a testing apparatus for determining the dew-point of a liquified petroleum gas-water system and relates more particularly to a dew-point testing method and apparatus for use in determining the dew-point of a propane-water system.

The liquid products of petroleum refining often are handled or stored under conditions such that they become saturated with water. The dissolved water will be, in some cases, an undesirable impurity and a knowledge of its concentration is of value. The water content of liquified petroleum hydrocarbons which are used as fuels and refrigerants is of particular importance in order to avoid regulator freeze-up and other interruptions in the flow of the gas.

It will be clear to those skilled in the art that the dew-point of a propane-water system is the temperature at which a given mixture of propane and water vapor is saturated with water vapor.

It will be clear to those skilled in the art that the dew-point of a propane-water system is the temperature at which a given mixture of propane and water vapor is saturated with water vapor.

At the present time, determination of moisture in propane to meet standard specifications, is based on a so-called "cobalt bromide" test which is purely qualitative, while determination of moisture by the "dew-point" method is quantitative. So far as I know, the liquified petroleum gas industry has only one apparatus to determine the dew-point of a propane-water system but this is expensive and complicated of manipulation, thus presenting two definitely objectionable features which have inspired the present invention.

It is therefore the primary object of my invention to provide a dew-point testing apparatus for liquified petroleum gas-water systems which may be manufactured at a greatly reduced cost due to its simplicity in construction and its economy in the use of materials.

Another object of the invention is to provide a dew-point testing apparatus by means of which the desired results may be more quickly obtained while at the same time avoiding certain inherent errors in known apparatus.

A further object is to provide a testing apparatus of this nature which is contained in a transparent housing and including readily visible means for observing the results of the tests.

Still another object of the invention is to provide an apparatus for determining the dew-point of vapors which consists in floating a disc having a highly polished upper surface, on a column of supporting fluid, impinging a stream of vapors to be tested, on said surface, gradually lowering the temperature of the column of fluid and with it the disc, by controlled refrigeration and observing the temperature of said column of fluid at the moment condensation of vapors appears on said disc.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views, Figure 1 is a vertical sectional view showing the various parts of the apparatus in their relative positions, Figure 2 is a transverse sectional view taken on line 2—2 of Figure 1, and Figure 3 is a somewhat diagrammatic view showing a complete assembly, including the refrigerant container.

In the drawings 10 represents a cylindrical casing composed of Lucite or other suitable transparent plastic material, closed at its lower end by a bottom 11 and externally threaded at its upper end as at 12 to accommodate complementary threads on a cap or closure 13. As will later appear, the cylinder 10 is formed of transparent material in order to enable the operators to readily observe the instrument from any angle.

In the lower portion of the casing 10 I introduce a column of mercury 14 which preferably occupies approximately one-third of the internal area of the casing and on the top surface of this column of mercury, floats a stainless steel disc 15. This disc is preferably circular in form and of a circumference which provides sufficient clearance with respect to the inner walls of the casing 10, to allow vertical movement of the disc upon expansion and contraction of the column of mercury.

The top surface of the disc 15 is highly polished to a mirror brightness so as to readily respond to the contact of vapors impinging thereon, as will later appear.

A cooling coil 16 is installed in the lower portion of the casing 10 below the level of the column of mercury 14 and surrounded thereby. A liquid propane line 17 having an inlet control valve 18 is connected to the inlet end of the cooling coil 16 which projects through a suitable opening in the bottom 11 of the casing 10, the outlet end of said cooling coil projecting through a similar opening in bottom 11 and terminating in a discharge of vent pipe 19.

A thermometer 20 is supported in an opening in the cap 13 with its lower end projecting through an opening 21 in the disc 15 and being submerged in the column of mercury 14. If desired a collar 22 of rubber or other suitable material may be inserted in the opening in the cover 13, in order to maintain the proper location of the thermometer 20.

A line 23 having a control valve 24, leads from the source (not shown) of the liquified petroleum gas to be tested and to the end of this line 23, is connected a tube 25 which extends through an opening in cover 13 and projects into the interior of the casing 10, along side and parallel to the thermometer 20. The lower extremity of the tube 25 terminates a predetermined distance above the stainless steel disc 15 and is provided with a nozzle 26 having an orifice 26ᵃ, preferably about 1/16 of an inch in size, which is directed onto the upper surface of the disc 15.

The upper portion of the wall of casing 10 is provided with a vent hole 27 by means of which vapor is introduced into the casing for testing, can escape to atmosphere.

In the operation of the apparatus thus far described, the valve 18 is first opened to permit liquid propane or other suitable refrigerant to expand into the cooling coils 16, thus refrigerating the surrounding column of mercury. The propane or other vapors to be tested, are then permitted to flow from line 23, through pipe 25, by opening the valve 24 so that a constant stream of such vapor is discharged through the nozzle 26 and impinges upon the upper surface of the stainless steel disc 15, located immediately below the nozzle orifice 26ᵃ.

By means of the thermometer 20, the exact temperature of the column of mercury, and with it that of the stainless steel disc 15, can be ascertained and at the moment that a dark spot or condensation area appears on the mirror surface of the disc directly under the nozzle 26 as indicated at 15ᵃ in Fig. 2, the thermometer reading is taken and recorded as the dew-point of that particular sample. It should be noted that during this operation the temperature of the mercury bath is lowered slowly by controlling the valve 18, until the condensation spot becomes visible on the disc 15.

In order to raise the temperature of the mercury after each test so as to reduce the time required between tests, the invention contemplates the passage of warm propane vapor through the cooling coils 16, after shutting off the valve 18 which controls the liquid propane line 17. As shown in the drawing, a branch line 28 leads from the propane vapor line 23 to the inlet end of the cooling coils 16 immediately above the valve 18 and a suitable control valve 29 is provided for regulating the flow of these warm vapors. Thus, by closing the valve 18 and opening the valve 29 the temperature of the column of the mercury 14 may be raised as desired.

In order to minimize connections in preparation for making a test and to reduce the time necessary in running each test, I propose to draw the propane refrigerant from a relatively small container, for example a half gallon receptacle 30, as shown in Fig. 3, into which the line 17 is connected. Thus, the only coupling required in order to start a test, would be the connection of the line 23, leading from the vapor source, to the tube 25.

I have selected mercury for use as the bath of column 14 because of its excellent heat transfer properties and because it is not affected by nor does it effect the vapors to be tested. However, other medium can be used, although perhaps not as effectively, so long as they do not solidify at temperatures above minus 40° F. For example, ethylene glycol or similar materials might be used.

It should be noted that the mercury used in this apparatus has a melting point of approximately minus 39° F. To obtain a dew-point below this temperature, the melting point must be lowered and this can be accomplished by dissolving any one of the following metals in mercury: silver, lead, antimony and babbit.

While I have described the disc 15 as composed of stainless steel, it will be understood that I do not intend to confine myself in this respect, as any other material could be used, provided it will not dissolve in the mercury and that it will take on a highly polished surface to effect a mirror brightness.

Although the foregoing description has dealt primarily with propane-water systems, I may say that the apparatus can also be used to determine hydrocarbon dew-points, for example, in a mixture of butane and propane. In this case, the dew-point is the temperature at which the mixture becomes saturated with butane.

It will thus be seen that I have provided an extremely simple and inexpensive piece of apparatus which is readily portable and easily used and it is felt that this should fill a long-felt need in the liquified petroleum gas industry.

From the foregoing it is believed that my invention may be readily understood by those skilled in the art, without further description, it being borne in mind that numerous changes may be made in the details disclosed, without departing from the spirit of the invention as set forth in the following claims.

I claim:

1. A dew-point testing apparatus, comprising a container having transparent side walls, a column of supporting fluid in said container, a horizontally disposed disc of thermal conductive material having a highly polished upper surface floating on the top of said column, means for refrigerating said column of fluid, a temperature indicator for said column of fluid, and a tube connected to the source of vapors to be tested, the discharge end of said tube extending downwardly into said container and being directed against said polished surface, to impinge a stream of said vapors thereon.

2. A dew-point testing apparatus, comprising a container having transparent side walls, a column of mercury in said container, a horizontally disposed disc of thermal conductive material having a highly polished upper surface floating on the top of said column, means for refrigerating said column of mercury, a temperature indicator for said column of mercury, and a tube connected to the source of vapors to be tested, the discharge end of said tube extending downwardly into said container and being directed against said polished surface, to impinge a stream of said vapors thereon.

3. A dew-point testing apparatus, comprising a transparent container, a column of mercury in said container, a horizontally disposed metallic disc having a highly polished upper surface floating on the top of said column of mercury, means for refrigerating said column of mercury, a temperature indicator for said column of mercury, and a tube connected to the source of vapors to be tested, the discharge end of said tube extending downwardly into said container and being directed against said polished surface, to impinge a stream of said vapors thereon.

4. A dew-point testing apparatus comprising a transparent container, a column of supporting fluid in said container, a horizontally disposed disc of thermal conductive material having a highly polished upper surface floating on the top of said column, refrigerating coils submerged in said column of fluid and connected to a source of refrigerant, a temperature indicator for said column of fluid, and a tube connected to the source of vapors to be tested, the discharge end of said tube extending downwardly into said container and being directed against said polished surface, to impinge a stream of said vapors thereon.

5. Apparatus as claimed in claim 4, wherein said column of fluid consists of mercury.

6. Apparatus as claimed in claim 4, including means for introducing warm vapor to said refrigerating coils, to raise their temperature at the conclusion of a test.

References Cited in the file of this patent

UNITED STATES PATENTS

| Number | Name | Date |
|---|---|---|
| 2,433,486 | Schmitz | Dec. 30, 1947 |
| 2,591,084 | Martin | Apr. 1, 1952 |
| 2,593,313 | Kamm et al. | Apr. 15, 1952 |